United States Patent [19]

Sugihara

[11] 4,353,926

[45] Oct. 12, 1982

[54] SODA CRACKERS

[75] Inventor: Takashi F. Sugihara, Pinole, Calif.

[73] Assignee: The United States of America as represented by the Secretary of Agriculture, Washington, D.C.

[21] Appl. No.: 98,460

[22] Filed: Nov. 29, 1979

[51] Int. Cl.$^3$ .............................................. A21D 8/04
[52] U.S. Cl. ...................................... 426/20; 426/52; 426/62
[58] Field of Search ....................... 426/20, 52, 61, 62

[56] References Cited

U.S. PATENT DOCUMENTS

| | | | |
|---|---|---|---|
| 2,920,964 | 1/1960 | Oakes | 426/26 |
| 3,410,755 | 11/1968 | Etchells | 426/52 |
| 3,547,654 | 12/1970 | Olsen | 426/20 |
| 3,677,897 | 7/1972 | Jeffreys | 426/20 |

FOREIGN PATENT DOCUMENTS 2459049 11/1975 Fed. Rep. of Germany ........ 426/44

OTHER PUBLICATIONS

Reed et al., Yeast Technology, Avi Publishing Co. Inc., Conn. 1973, pp. 154, 156 & 157.
Sugihara, Journal of Food Protection:41, "Microbiology of the Soda Cracker Process", pp. 977-979 and 980-982, 12-78.

*Primary Examiner*—Raymond N. Jones
*Assistant Examiner*—Elizabeth A. Hatcher
*Attorney, Agent, or Firm*—M. Howard Silverstein; David G. McConnell; Margaret Conner

[57] ABSTRACT

Processes and compositions for preparing soda crackers are described. In the present process a liquid starter is employed to supply the necessary microorganisms, *Lactobacillus plantarum, Lactobacillus delbrueckii,* and *Lactobacillus leichmanni.*

13 Claims, No Drawings

SODA CRACKERS

BACKGROUND OF THE INVENTION

1. Field of the Invention

This invention relates to and has among its objects the provision of novel methods and products for preparation of soda crackers. It is a particular object of the invention to substantially reduce the fermentation time of the dough or sponge in the process of preparing soda crackers. Further objects of the invention will be evident from the following description wherein parts and percentages are by weight unless otherwise specified.

2. Description of the Prior Art

Soda crackers have been manufactured since 1840. The soda cracker industry has grown to giant proportions over the years and now includes crackers of many different forms and flavors. Generally, soda crackers are prepared by forming a dough containing among others, flour, malt syrup, salt, baking soda, and a fermented starter or sponge containing flour, shortening, yeast, and water. The dough is then fermented, formed into the desired shape and baked. One basic problem is that the above-mentioned fermentations are conducted by relying on chance contamination by an appropriate microorganism.

Although soda crackers have been known for about 140 years, the microbial factors responsible for the process heretofore have not been discovered. It has always been known, of course, that some microbial action was involved; however, the nature of the organism or organisms has remained unknown.

SUMMARY OF THE INVENTION

Our investigations have revealed that at least three distinct microorganisms are involved besides Baker's yeast, i.e., *Saccharomyces cervisiae*, which is part of the standard formulation.

The dominant microorganism involved in soda cracker formation is *Lactobacillus plantarum*, closely related to or belonging to the genus Lactobacillus. This species of bacterium is known but has never been disclosed as an actor in the fermentation of soda cracker sponge and dough.

Other microorganisms involved in the production of soda crackers are *Lactobacillus delbrueckii* and *Lactobacillus leichmanni*, and, to a lesser degree *Lactobacillus brevis*, *Lactobacillus casei*, and *Lactobacillus fermentum*. As with *Lactobacillus plantarum*, the above microbial factors are known but have never been implicated in soda cracker sponge and dough fermentation.

The primary feature of the invention is the substantial reduction in fermentation time for the sponge and dough. The sponge fermentation time can be decreased by a factor of at least four, and the dough fermentation time can be reduced by a factor of at least two. Thus, the conventional process for preparing soda crackers requiring 24 hours now can be carried out in approximately eight hours. The aforementioned advantage is realized by employing a liquid starter of particular composition in place of the conventional sponge in soda cracker preparation.

Further advantages of the novel starter of the invention may be outlined as follows. First, the liquid starter of the invention can be cooled to about 10°–13° C. to prevent decrease in its vigor and numbers. Thus, flexibility in scheduling the soda cracker preparation can be attained. The cooled liquid starter can be held for 24–28 hours without significant deterioration. Because of its liquid nature, the present starter, in contrast to the conventional sponge, is more susceptible to cooling. Good heat transfer rates are attained when the starter of the invention is contacted with a cold surface such as a refrigerated coil or jacket.

Another advantage of the invention is the ease with which the novel liquid starter can be conveyed and mixed into soda cracker formulations. The present liquid starter can be metered and pumped in conventional equipment used for handling food liquids and slurries. In this way, soda cracker plant operations are simplified.

A further advantage of the invention is that the liquid starter can be made up in simple and relatively inexpensive equipment such as a tank provided with an ordinary electric stirrer. This is in sharp contrast to conventional sponge, which require specialized dough-mixing equipment. Obvious savings in equipment cost are thus realized. Furthermore, the liquid starter is not subject to any limitations with respect to batch size, save the volume of the tank used to prepare the starter.

A very important advantage of the invention is the avoidance of chance contamination relied on in the prior art process. The present liquid starter can be prepared with the appropriate microorganisms found to be required in the soda cracker process. Additionally, the flavor of the soda crackers can be controlled by the particular microorganisms or mixtures thereof incorporated into the liquid starter, a feature which was impossible in the known techniques. Consequently, quality control of soda cracker preparation is greatly enhanced and delayed fermentations and off-fermentations can be eliminated.

DESCRIPTION OF THE PREFERRED EMBODIMENTS

In preparing the liquid starter of the invention, the basic ingredients are flour, water, and an inoculum. As noted previously, the ingredients may be blended in a tank equipped with a power-driven agitator or the like.

The proportion of water to flour may be varied within certain limits. If the proportion of water is too low, a liquid product that can be readily metered and pumped will not be obtained. Good results can be achieved in the present invention when about 3–5 parts of water, preferably 4 parts of water, per part of flour.

The inoculum for the flour-water mixture can be a portion of developed liquid starter from a previous batch. Alternatively, one may add pure cultures of the aforementioned microorganisms. Another but less preferable plan is to inoculate the slurry with a portion of conventionally developed soda cracker sponge. Regardless of the kind of inoculum used, it is necessary that it contain the needed organisms in such an amount that the liquid starter can be developed within a reasonable time, i.e., about 6 to 8 hours. This result is readily attained when the inoculum is added in such an amount as to provide in the liquid starter at zero (make-up) time a concentration of the microorganism about 100-50 million per gram of liquid starter. During the development period each of the organisms increases approximately 10-fold Thus, in a typical case the initial concentration will be $1 \times 10^8$ bacterial cells/gram of liquid starter, after development the concentrations will be on the order of $10 \times 10^8$ bacterial cells per gram of liquid starter.

During make-up of the liquid starter of the invention, it is preferable to adjust the pH to about 5. For this purpose one may use acetic acid, lactic acid, hydrochloric acid, or any other non-toxic acid. This lowering of the pH has the desirable effect of suppressing growth of any adventitious microorganisms that may be present in the preparatory materials, such as the flour. The low pH, however, has little or no adverse effect on the growth of the desirable microorganisms since these can proliferate in media having pH's well below 5. It may be noted that where the liquid starter is made with previously developed liquid starter as the inoculum, the pH will be close to 5, and hence acid need not be added.

After the liquid starter has been prepared, it is developed to cause multiplication of the lactic bateria and development of gluten in the flour. No special apparatus is required for the development; the starter may be left in the tank wherein it was made and agitation applied at a speed sufficient to just keep the flour from settling. The top of the tank is kept closed to avoid contamination. The development may be carried out over a wide temperature range—about from 25° to 35° C. with the understanding that multiplication of the organisms takes place faster at the higher temperatures of said range. The fully developed starter usually has a pH of 3.8 to 4.0. The preferred temperature is about 28° to 32° C. for the development, so that a high rate of cell multiplication combined with stability of the organisms when they reach peak development is attained. A most preferable technique is to start the development at a temperature somewhat below 30° C., e.g., 25° C., and rely on the autogenous heating of the system to bring it to 30° C. as the peak of development is achieved, which is usually about 6-7 hours. The starter is then ready for use in preparing dough. It is, of course, obvious that a portion of the developed starter may be retained for use as the inoculum for preparing a next batch of starter to perpetuate the system.

In the event that the developed liquid starter is not needed directly after it has been developed, it may be cooled to about 10°-13° C. and held at such temperature until it is required for dough preparation. If the starter is to be held for an extended time, it is preferable to reduce the development time, for example, to about 2 to 4 hours, and then cool the starter to 10°-13° C. and hold it at such temperature until it is to be used.

EXAMPLES

The invention is demonstrated further by the following illustrative examples. In describing formulations of doughs, sponges, starters, etc., percentages of ingredients are based, as in the foregoing description, on the amount of flour in the formulation unless otherwise indicated.

EXAMPLE 1

Preparation of Pure Cultures of Soda Cracker Microorganisms

To a Fernback flask was added 1 l. of MRS broth (Difco Laboratories, Detroit, Mich.). The broth was inoculated with about 10% of a broth culture of *Lactobacillus plantarum* prepared as follows: Eleven grams of sponge obtained from a commercial soda cracker plant was aseptically blended for 90 seconds at reduced speed with 99 ml. of sterile 0.1% aqueous peptone in a sterilized 250 ml Osterizer jar. After serial dilution in sterile 0.1% peptone the sample was plated out on MRS agar (Difco Laboratories) by spread plate technique and incubated for 2 days at 30° C. The colony representing *Lactobacillus plantarum* was picked and carried on MRS slants. The broth culture was prepared by suspending the growth of a 24-hour MRS slant in 5 ml. of sterile distilled water. The microorganism was identified using standard techniques and Bergey's "Manual of Determinative Bacteriology," Eighth edition, The Williams and Wilkin Co., Baltimore, Md. (1974).

The inoculated broth was incubated at 30° C. in a New Brunswick Rotary Shaker Incubator with agitation set at 150 rpm. After 24 hours, the cultures were cooled to 8° C. and the cells were separated by means of a Sharples Super Centrifuge. The cells, if not used immediately, were resuspended in a stabilizing menstrum consisting of 40% glycerol and 60% of an aqueous solution containing 8% non-fat milk solids, 2% monosodium glutamate, and 0.5 Tween-80 (solution is made up and sterilized by autoclaving at 15 psi for 15 minutes). The harvested cells were mixed with the stabilizer menstrum in a ratio of 1:4 and then the mixture was homogenized with a Kraft Non-Aerating Stirrer (Model S-25). Stabilized cell concentrates were placed in screw-capped polyethylene bottles and flask frozen at $-100°$ C.; the frozen samples were stored at $-100°$ C. whereat it retained substantial viability for at least 10 months. When the product was used, it was thawed and used directly.

Further details on preparation of cultures of *Lactobacillus plantarum* are disclosed in the *Journal of Food Protection*, December 1978, pages 977–979 and pages 980–982, both of which are incorporated herein by reference.

Similar procedures were employed to prepare pure cultures of *Lactobacillus delbrueckii, Lactobacillus leichmanni, Lactobacillus brevis, Lactobacillus casei,* and *Lactobacillus fermentum.*

EXAMPLE 2

Formulation for Liquid Starter

| | | Parts |
|---|---|---|
| A. | Flour (9% protein) | 100 |
| | Water | 400 |

Pure cultures were added to furnish approximately the following concentrations of these organisms in the liquid starter:

| | | |
|---|---|---|
| | L. plantarum | $1 \times 10^8$ |
| | L. delbrueckii | $1 \times 10^8$ |
| | L. leichmanni | $1 \times 10^8$ |
| | | Parts |
| B. | Flour | 100 |
| | Water | 400 |
| | L. plantarum | $1 \times 10^8$ |
| | L. delbrueckii | $1 \times 10^8$ |
| C. | Flour | 100 |
| | Water | 400 |
| | L. plantarum | $1 \times 10^8$ |

EXAMPLE 3

Preparation of Soda Crackers

In utilizing the liquid starter of the invention, a sponge is first prepared using a formulation which differs from the conventional system since all of the water in the sponge formula is derived from the liquid starter (80% water). The formula is adjusted to allow for this difference as follows:

|  | Parts |
|---|---|
| Flour (9% protein) | 100 |
| Shortening | 21 |
| Yeast (compressed) | 0.33 |
| Liquid starter (80% water) | 53 |

Conventional short time gentle mixing is used (for Laboratory scale studies a Hobart Mixer, Model 200A, equipped with a dough hook, was used at speed 1 for 1½ minutes).

The sponge is allowed to ferment for 4 hours at 30° C. The final soda cracker dough is prepared by adding the following ingredients to the fermented sponge.

|  | Parts |
|---|---|
| Sponge (fermented for 4 hours) | 100 |
| Flour (9% protein) | 67 |
| Malt syrup (diastatic) | 2.5 |
| Salt | 2.5 |
| Soda (amount varies with pH) | 1.5–2.0 |

Conventional short time gentle mixing is used (for laboratory scale studies a Hobart Mixer, Model 200A, equipped with a dough hook, was used at speed 1 for 2 minutes).

The dough is allowed to ferment for 2 hours at 30° C. The fully fermented dough is then laminated, sheeted, perforated, docked, trimmed and baked at 550° F. for approximately 3 minutes.

Having thus described the invention, what is claimed is:

1. A method for rapid, controlled preparation of soda cracker dough, which comprises the steps of
   (a) preparing a liquid starter by a process comprising
       forming a slurry containing flour and water in the proportion of about 3–5 parts of water per part of flour,
       inoculating the slurry with viable cells of *Lactobacillus plantarum* in a concentration such that the liquid starter can be developed in about 6–8 hours, and developing the inoculated slurry by holding it with agitation at a temperature of about 25°–35° C. to cause proliferation of the added microorganisms,
   (b) preparing a liquid sponge by a process comprising
       mixing the liquid starter with flour, shortening, and yeast, and
       fermenting the liquid sponge, and
   (c) mixing a portion of the so-prepared and so-fermented liquid sponge with flour to form a soda cracker dough, the amount of liquid starter mixed with flour in step b being sufficient to reduce the fermentation time of the sponge and the amount of liquid sponge mixed with flour to form a soda cracker dough in step c being sufficient to reduce the fermentation time of the dough such that
       step b and c above are carried out in approximately eight hours or less.

2. The method of claim 1 wherein the slurry of Step a is further inoculated with viable cells of *Lactobacillus delbrueckii*.

3. The method of claims 1 or 2 wherein the slurry of Step a is further inoculated with viable cells of *Lactobacillus leichmanni*.

4. The method of claim 3 wherein the inoculation in Step a is with pure cultures of the stated microorganisms.

5. The method of claim 1 or 2 wherein the inoculation in Step a is with pure cultures of the stated microorganisms.

6. The method of claim 1 wherein the inoculation of Step a is with a portion of a liquid starter from a previous batch.

7. The method of claim 1 wherein the temperature in Step a is about 28°–32° C.

8. The method of claim 1 wherein the slurry of Step a contains flour and water in the proportions of 4 parts of water per part of flour.

9. The method of claim 1 wherein Step a further includes cooling the slurry to about 10°–13° C. and holding it at that temperature for future use.

10. A liquid starter for the production of soda crackers, being the product prepared by
    forming a slurry containing flour and water in the proportion of about 3–5 parts of water per part of flour,
    inoculating the slurry with viable cells of *Lactobacillus plantarum* in a concentration such that the liquid starter can be developed in about 6–8 hours, and
    developing the inoculated slurry by holding it with agitation at a temperature of about 25°–35° C. to cause proliferation of the added microorganisms.

11. A liquid sponge for the production of soda crackers, being the product prepared by
    step b of claim 1.

12. The liquid starter of claim 9 wherein the slurry is inoculated further with viable cells of *Lactobacillus delbrueckii*.

13. The liquid starter of claims 9 or 11 wherein the slurry is inoculated further with viable cells of *Lactobacillus leichmanni*.

* * * * *

UNITED STATES PATENT AND TRADEMARK OFFICE
CERTIFICATE OF CORRECTION

PATENT NO. : 4,353,926

DATED : October 12, 1982

INVENTOR(S) : TAKASHI F. SUGIHARA

It is certified that error appears in the above—identified patent and that said Letters Patent is hereby corrected as shown below:

Claim 12, line 1, delete "9" and insert -- 10 --.

Claim 13, line 1, delete "9 or 11" and insert -- 10 or 12 --.

Signed and Sealed this

Eighth Day of February 1983

[SEAL]

Attest:

GERALD J MOSSINGHOFF

Attesting Officer

Commissioner of Patents and Trademarks